H. Dodge,
Cotton Press
Nº 47,192. Patented Apr. 11, 1865.
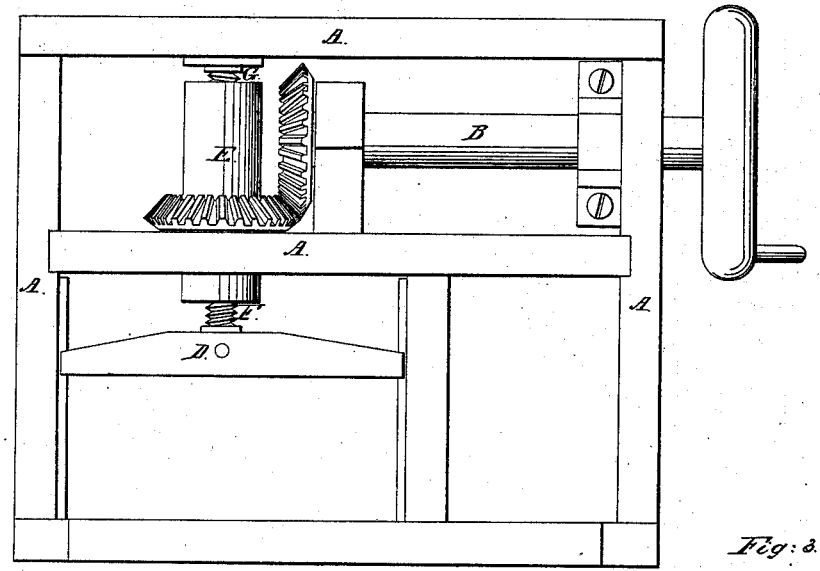
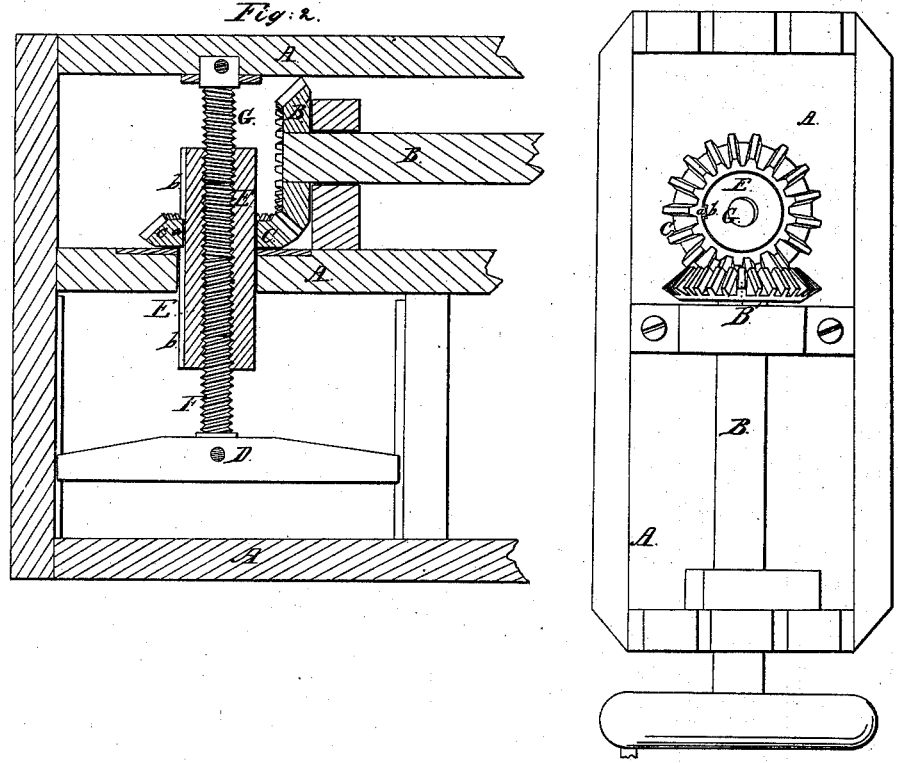
Witnesses:
Inventor:

United States Patent Office.

HEZEKIAH DODGE, OF ALBANY, NEW YORK.

IMPROVEMENT IN PRESSES.

Specification forming part of Letters Patent No. 47,192, dated April 11, 1865.

*To all whom it may concern:*

Be it known that I, HEZEKIAH DODGE, of the city and county of Albany, State of New York, have invented a new and Improved Press; and I do hereby declare that the following is a full, clear, and exact description thereof, reference being had to the accompanying drawings, making a part of this specification, in which—

Figure 1 is a side elevation of the press. Fig. 2 is a vertical section through the press. Fig. 3 is a top view.

Similar letters of reference indicate corresponding parts in the three figures.

This invention relates to a new and improved machine which is intended for pressing hay, cotton, tobacco, or for other purposes where a press is required.

The object of my invention is to obtain a press which shall be very compact and still give all the required length of movement to the follower, and in which the follower shall be attached firmly to a solid screw-shaft that is acted upon and moved in a direction with its length by means of spurred gearing and a shaft arranged at right angles to the axis of said screw-shaft, as will be hereinafter described.

To enable others skilled in the art to make and use my invention, I will describe its construction and operation.

In the accompanying drawings, A represents the frame of the press, and B is a rotating shaft, carrying on one end a bevel spur-wheel, B', which engages with the teeth of a bevel-wheel, C, which is supported upon a shelf of the frame A, as shown in the drawings. The shaft B is used as the driving-shaft for transmitting motion to the follower D, and either steam, horse, or manual power may be applied to this shaft in any convenient manner.

E represents an elongated hollow right-and-left screw or cylindrical nut, which passes loosely through the center of the bevel-wheel C, and is attached to this wheel by means of a key-tenon, a, fitting in a groove, b, which is formed in the outer surface of the hollow screw in a direction with its length. This allows the screw E to be rotated by the wheel C, and to reciprocate in a direction with its length. The proper length to make this rotating and vertically-reciprocating screw E will depend upon the length of movement which it is desired to give to the follower D.

This follower D may be made in any suitable manner, and guided in its vertical movements by parallel beams of the frame A, which beams have tenons formed on them that fit into notches made in the ends of the follower, as represented in Figs. 1 and 2.

To the follower D a solid screw, F, is secured, which may be equal in length to one-half the length of the rotary reciprocating hollow screw E, into which said screw F enters. The upper end of the hollow screw E receives a solid screw-shaft, G, which is secured rigidly to the uppermost beam of the frame A, as shown in Figs. 1 and 2, and which has its threads cut on it in the reverse direction to the direction of the threads on the follower-screw F, as clearly shown in Fig. 2.

In putting together the parts of the press above described, the ends of both screws F and G may be entered into the ends of the hollow screw E simultaneously. Then, by continuing the rotation of this screw E, the lower shaft, F, will approach the fixed upper shaft, G, and the follower D, together with the hollow screw E, will be elevated. When the shaft B is turned in a reverse direction, the screw E will move downward with a speed which is proportionate to the motion of said shaft B and the distance apart of the screw-threads, and simultaneously with this motion the follower D will be depressed with a speed which is double that of the screw E, if the threads and diameters of the two screws F and G are equal.

It will be seen from the above description that I obtain a great length of movement of the follower in a short vertical space in consequence of my employing what might be termed "extensible" or "telescopic" shafts, which are extended or contracted to elevate or depress the follower.

Having thus described my invention, what I claim as new, and desire to secure by Letters Patent, is—

1. The combination of the right-and-left hollow screw E, fixed screw G, and movable screw F, with the follower D, substantially as and for the purposes described.

2. The stationary and movable right-and-left screw-shafts F and G, hollow screw E, and spur-wheel C, with the driving spur-wheel and shaft B B', substantially as described.

Witnesses:                 HEZ. DODGE.
JAS. H. BULLOCK,
M. V. B. WINNE.